(12) United States Patent
Feliberti et al.

(10) Patent No.: US 8,392,365 B2
(45) Date of Patent: Mar. 5, 2013

(54) IDENTIFYING CORRUPTED DATA ON CALENDARS WITH CLIENT INTENT

(75) Inventors: Vanessa C. Feliberti, Sammamish, WA (US); Roberto Ribeiro da Fonseca Mendes, Seattle, WA (US); Shaheeda P. Nizar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 12/647,962

(22) Filed: Dec. 28, 2009

(65) Prior Publication Data

US 2011/0161286 A1    Jun. 30, 2011

(51) Int. Cl.
G06F 7/00 (2006.01)
G06F 17/00 (2006.01)
G06Q 10/00 (2012.01)

(52) U.S. Cl. ........ 707/614; 707/616; 707/627; 707/951; 705/7.19

(58) Field of Classification Search .......... 707/613–616, 707/623, 951, 627; 705/7.19
See application file for complete search history.

(56) References Cited

U.S. PATENT DOCUMENTS

| | | | |
|---|---|---|---|
| 5,774,867 A | 6/1998 | Fitzpatrick et al. | 705/8 |
| 5,960,406 A | 9/1999 | Rasansky et al. | |
| 6,064,977 A | 5/2000 | Haverstock et al. | |
| 6,295,541 B1 * | 9/2001 | Bodnar et al. | 1/1 |
| 6,480,830 B1 | 11/2002 | Ford et al. | |
| 6,604,079 B1 | 8/2003 | Ruvolo et al. | |
| 6,781,920 B2 | 8/2004 | Bates et al. | 368/10 |
| 7,318,040 B2 | 1/2008 | Doss et al. | 705/9 |
| 7,487,234 B2 | 2/2009 | Doss et al. | 709/223 |
| 7,584,114 B2 | 9/2009 | Estrada et al. | 705/9 |
| 7,584,412 B1 | 9/2009 | Raff | 715/203 |
| 7,644,125 B2 | 1/2010 | Baynes et al. | |
| 7,689,698 B2 | 3/2010 | Hullot et al. | |
| 7,792,790 B2 | 9/2010 | Kim | |
| 7,814,055 B2 | 10/2010 | Hullot et al. | |
| 7,822,713 B2 | 10/2010 | Hullot et al. | |
| 7,827,240 B1 * | 11/2010 | Atkins et al. | 709/204 |
| 7,840,543 B2 | 11/2010 | Guiheneuf et al. | |
| 7,873,646 B2 | 1/2011 | Yach et al. | |
| 7,917,127 B2 | 3/2011 | Mousseau | |
| 7,991,637 B1 | 8/2011 | Guiheneuf et al. | |
| 8,019,863 B2 | 9/2011 | Jeide et al. | |
| 8,041,594 B2 | 10/2011 | Wilbrink et al. | |
| 8,041,725 B2 | 10/2011 | Grant et al. | |
| 2003/0050982 A1 | 3/2003 | Chang | |
| 2003/0131023 A1 | 7/2003 | Bassett et al. | |

(Continued)

OTHER PUBLICATIONS

"*Introducing BusyCal*"; accessed on Oct. 28, 2009 at http://www.busymac.com/; 2 pgs.

(Continued)

*Primary Examiner* — James E Richardson
(74) *Attorney, Agent, or Firm* — Merchant & Gould P.C.

(57) ABSTRACT

Identification of corrupted event data may be provided. Calendar events, such as appointments and meetings, may be created and copied to a plurality of attendee calendars. Changes to the event may be logged and, if the change results from a user interaction with a user interface, a user intent identifier may be associated with the log entry. Other changes that do not result from direct user interaction may not be associated with the user intent identifier. Event corruption detection may identify out-of-sync properties between two calendar events associated with the same meeting and, if the out-of-sync property is not associated with the user intent identifier, the properties may be updated to match each other.

20 Claims, 5 Drawing Sheets

U.S. PATENT DOCUMENTS

| | | | |
|---|---|---|---|
| 2003/0154116 A1 | 8/2003 | Lofton | 705/8 |
| 2004/0064567 A1 | 4/2004 | Doss et al. | 709/228 |
| 2004/0203644 A1 | 10/2004 | Anders et al. | |
| 2004/0225966 A1 | 11/2004 | Besharat et al. | |
| 2005/0102317 A1 | 5/2005 | Kamarei | 707/102 |
| 2005/0149726 A1* | 7/2005 | Joshi et al. | 713/164 |
| 2005/0187896 A1 | 8/2005 | Mousseau | |
| 2005/0198085 A1 | 9/2005 | Blakey et al. | 707/204 |
| 2005/0216842 A1 | 9/2005 | Keohane et al. | 715/733 |
| 2006/0007785 A1 | 1/2006 | Fernandez et al. | |
| 2006/0212330 A1 | 9/2006 | Savilampi | 705/8 |
| 2007/0079260 A1 | 4/2007 | Bhogal et al. | |
| 2007/0162517 A1 | 7/2007 | Teegan et al. | 707/201 |
| 2007/0260989 A1 | 11/2007 | Vakil et al. | |
| 2008/0046437 A1 | 2/2008 | Wood | 707/10 |
| 2008/0046471 A1 | 2/2008 | Moore et al. | 707/104.1 |
| 2008/0120158 A1 | 5/2008 | Xiao et al. | |
| 2008/0134041 A1 | 6/2008 | Zinn | |
| 2008/0140488 A1 | 6/2008 | Oral et al. | 705/8 |
| 2008/0307323 A1* | 12/2008 | Coffman et al. | 715/753 |
| 2009/0019050 A1 | 1/2009 | Baron et al. | 707/9 |
| 2009/0040875 A1 | 2/2009 | Buzescu et al. | 268/29 |
| 2009/0112986 A1 | 4/2009 | Caceres | |
| 2009/0150812 A1* | 6/2009 | Baker et al. | 715/764 |
| 2009/0152349 A1 | 6/2009 | Bonev et al. | |
| 2009/0157414 A1 | 6/2009 | O'Sullivan et al. | 705/1 |
| 2009/0157693 A1 | 6/2009 | Palahnuk | |
| 2009/0158173 A1 | 6/2009 | Palahnuk et al. | |
| 2009/0196123 A1 | 8/2009 | Gautam | 368/52 |
| 2009/0248480 A1 | 10/2009 | Miksovsky | 705/9 |
| 2009/0313299 A1 | 12/2009 | Bonev et al. | |
| 2010/0042733 A1 | 2/2010 | Jeffrey | |
| 2010/0122190 A1 | 5/2010 | Lu | |
| 2010/0174679 A1 | 7/2010 | Baynes et al. | |
| 2010/0214875 A1 | 8/2010 | Wilson et al. | |
| 2011/0106278 A1 | 5/2011 | Martin-Cocher et al. | |
| 2011/0161453 A1 | 6/2011 | Feliberti et al. | |
| 2011/0161454 A1 | 6/2011 | Da Fonseca Mendes et al. | |

OTHER PUBLICATIONS

Microsoft TechNet; "*Understanding Calendar Repair*"; Microsoft Corporation; Sep. 9, 2009; accessed on Nov. 9, 2009 at http://technet.microsoft.com/en-us/library/dd298100.aspx; 2 pgs.

Oracle; "*Oracle® Calendar Administrator's Guide*"; 10g Release 1 (10.1.1); Oct. 2005; 170 pgs.

Desruisseaux, B., et al.; "*Calendaring Extensions to WebDAV (CalDAV)*" The Internet Society; Feb. 21, 2006; 82 pgs.

Dusseault, L., et al.; "*Open Calendar Sharing and Scheduling with CalDAV*"; Standards Track, IEEE Internet Computing, IEEE Computer Society; Mar./Apr. 2005; pp. 81-89.

Sun Microsystems; "*Sun Java™ System Calendar Server 6.3*" (White Paper); Apr. 2007; 40 pgs.

Microsoft TechNet; "*Understanding Calendar Repair*"; Sep. 9, 2009; accessed on Nov. 13, 2009 at http://technet.microsoft.com/en-us/library/dd298100(EXCHG.140).aspx; 2 pgs.

U.S. Official Action in U.S. Appl. No. 12/647,934 dated Dec. 27, 2011.

U.S. Official Action in U.S. Appl. No. 12/647,944 dated Dec. 22, 2011.

U.S. Official Action in U.S. Appl. No. 12/647,944 dated Jun. 12, 2012.

Notice of Allowance/Allowability in U.S. Appl. No. 12/647,934 dated Jun. 8, 2012.

U.S. Official Action in U.S. Appl. No. 12/647,934 dated Jul. 16, 2012.

* cited by examiner

300

|  | Monday | Tuesday | Wednesday | Thursday | Friday |
|---|---|---|---|---|---|
| 8:00 | | | | | |
| 9:00 | | | | | |
| 10:00 | | Meeting 310 | | | |
| 11:00 | | | | | |
| 12:00 | | | Lunch 320 | AAA 330 | |
| 1:00 | | | | | |
| 2:00 | | | | | |
| 3:00 | | | | | |
| 4:00 | | | | | |
| 5:00 | | | | | |
| 6:00 | | | | | |

|  | Monday | Tuesday | Wednesday | Thursday | Friday |
|---|---|---|---|---|---|
| 8:00 | | | | | |
| 9:00 | | | | | |
| 10:00 | | | | | |
| 11:00 | | | | | |
| 12:00 | | Meeting 360 | | XYZ 370 | |
| 1:00 | | | | | |
| 2:00 | | | | | |
| 3:00 | | | | | |
| 4:00 | | | | | |
| 5:00 | | | | | |
| 6:00 | | | | | |

- 410 — Title: Meeting
- 420 — Re: Project Status
- 430 — Organizer: John Smith
- 440 — Attendees: Jane Doe, Bill Jones, John Doe
- 450 — Start Time: 9:30 AM
- 460 — Duration: 1.5 Hours
- 470 — Reminder: 15 Minutes
- 480 — Location: Conference Room 1
- 490 — Notes: Jane's deadline changed. Bill's last report needs revision.

FIG. 4

IDENTIFYING CORRUPTED DATA ON CALENDARS WITH CLIENT INTENT

RELATED APPLICATION

Related U.S. patent application Ser. No. 12/647,934, filed Dec. 28, 2009, and entitled "Calendar Repair Assistant," assigned to the assignee of the present application, is hereby incorporated by reference.

Related U.S. patent application Ser. No. 12/647,944, filed Dec. 28, 2009, and entitled "Repairing Calendars with Standard Meeting Messages," assigned to the assignee of the present application, is hereby incorporated by reference.

BACKGROUND

Calendar repair is a process for updating meeting properties using a standardized message. In some situations, different copies of meeting events may be either inconsistent between organizers and attendees or contain corrupted data. Once bad meetings are identified, a mechanism is needed to repair the inconsistencies and/or corruptions. Conventional systems do not leverage existing calendar processing workflow and use direct-write access to each event. This causes problems because this can actually cause the sort of corruption of the event that the repair is meant to correct. Further, inconsistent or corrupted properties may be copied from one calendar to another.

SUMMARY

Calendar repair using standardized messages may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Identification of corrupted event data may be provided. Calendar events, such as appointments and meetings, may be created and copied to a plurality of attendee calendars. Changes to the event may be logged and, if the change results from a user interaction with a user interface, a user intent identifier may be associated with the log entry. Other changes that do not result from direct user interaction may not be associated with the user intent identifier. Event corruption detection may identify out-of-sync properties between two calendar events associated with the same meeting and, if the out-of-sync property is not associated with the user intent identifier, the properties may be updated to match each other.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIGS. 3A-3B are block diagrams of user calendars;
FIG. 4 is a block diagram of an example event.

DETAILED DESCRIPTION

Figure 1:
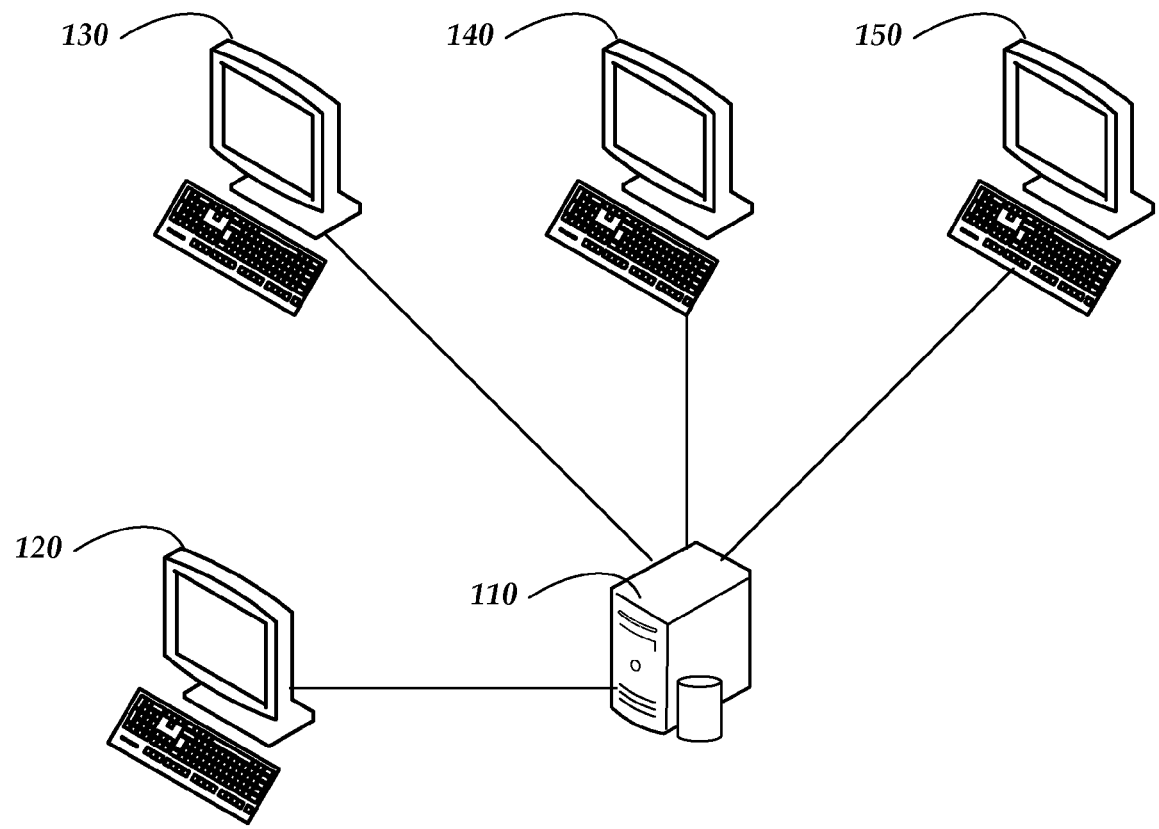
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The repair of calendar entries allows a server to correct inconsistencies between multiple copies of a single event. Determining when these inconsistencies should be corrected may benefit from providing additional intent data when a change to an event is made. By recording when a user makes a deliberate change to their copy of the event, as opposed to when a change is introduced by accident and/or by an automated process, differing properties can exist in copies of the same event while allowing an automatic repair process to correct corrupted properties.

Any calendar client software that modifies calendar items may save a special piece of user intent metadata together with the calendar item. This metadata may identify that the change is being done as a result of a user interaction with their calendar client. This metadata may be referred to as "client intent". The client intent may be stored as a property on the calendar item and may be available on the calendar item in any calendar folder. The client intent metadata may also be persisted as part of other copies of the event.

For meeting series and exceptions, deletions of individual instances may be recorded on the master/organizer event. The server may compare this event against previous versions of the recurrence to determine which instance was deleted. Responses, changes in time, and changes in location for exception copies of the event in the series may be recorded on the exception copy itself. A save operation on the event copy may reset the value of the intent, meaning that the intent on each snapshot of the meeting in an event log should reflect the action the user took at that moment. That is, while an initial change to the event may be intentional and may be associated with client intent metadata, a later change to the same property by an automated process may be recorded without the client intent metadata. The changed property of the event copy may thus be flagged as changed without intent during a later repair operation.

FIG. 1 is a block diagram of an operating environment 100 comprising a server 110, an organizer computer 120, and a plurality of attendee computers 130, 140, and 150. A user of organizer computer 120 may prepare a meeting request that may be relayed to users of the plurality of attendee computers 130, 140, and 150. The meeting request may comprise a plurality of properties, such as those described in greater detail below with respect to FIG. 4. Each attendee user may accept or reject the meeting request and/or propose changes to at least one of the meeting properties, such as proposing a different time or location. The organizer user may view each attendee's response in a calendar application on organizer computer 120 and review, accept, and/or reject any proposed changes by the attendees in the calendar application. Details regarding the event may be stored on server 110 and/or replicated to organizer computer 120 and/or any and/or all of plurality of attendee computers 130, 140, and 150. A calendar event (e.g. a meeting and/or an appointment) may be created and displayed on the organizer's calendar application. Upon acceptance of the meeting request, a copy of the calendar event may be placed on a calendar associated with the accepting attendee and similarly displayed on that attendee's calendar application.

Figure 2:
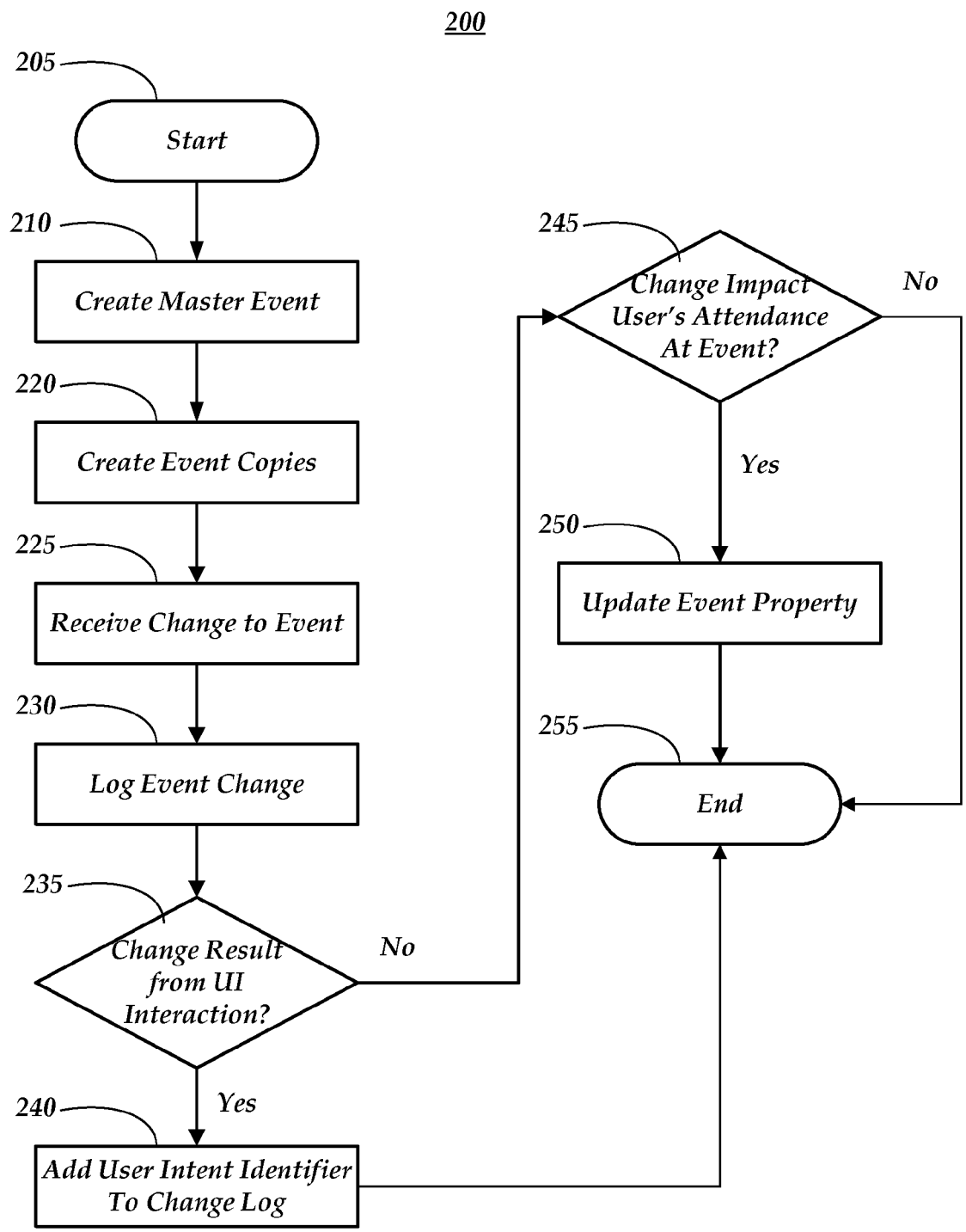
FIG. 2 is a flow chart of a method for providing calendar repair.

FIG. 2 is a flow chart setting forth the general stages involved in a method 200 consistent with an embodiment of the invention for providing calendar repair. Method 200 may be implemented using a computing device 500 as described in more detail below with respect to FIG. 5. Ways to implement the stages of method 200 will be described in greater detail below. Method 200 may begin at starting block 205 and proceed to stage 210 where create a first event. For example, server 110 may receive information associated with an event, such as an appointment or meeting, from an organizer of the event. The organizer's copy of the event may comprise a master copy of the event and may be stored on a calendar associated with the organizer. The event may be created through interactions with a calendar application's user interface.

Method 200 may then advance to stage 220 where computing device 500 may create copies of the first event on calendars associated with each of a plurality of attendees of the event. For example, a meeting request message may be sent, such as by an e-mail, to each of a plurality of users. Each user may accept or reject the meeting request in an e-mail/communication application. Upon acceptance of the meeting request, the application may create an event on the user's calendar, in an integrated calendar functionality of the communication application and/or in a separate calendar application. The application may copy properties from the organizer's event, such as start time, end time, duration, and/or location to create the attendee's event.

From stage 220, method 200 may advance to stage 225 where computing device 500 may receive a change to at least one of the events. For example, the start time property of one of the user's events may be changed, such as from 9:30 AM to 10:30 AM. The change may be to the organizer's event and/or one of the plurality of attendee events. Event changes may comprise, for example, deleting a meeting and/or an instance of a recurring meeting, changing an attendee's response status, changing the start time, end time, and/or duration of the meeting, changing the location of the meeting, and/or changing the subject of the meeting.

After receiving the event change at stage 225, method 200 may advance to stage 230 where computing device 500 may create an entry in a changelog recording the change to the event. For example, the entry may comprise an identifier for the event and details of the old and new values for the changed property. The changelog may be associated with the copy of the event being changed, and may record all changes to that copy of the event. Consistent with embodiments of the invention, the changelog may be associated with each of the copies of the event and/or the organizer copy of the event and may record all changes to any copy of the event. That is, a single changelog may be used to track changes made to any copy of the event for a given appointment and/or meeting.

From stage 230, method 200 may advance to stage 235 where computing device 500 may determine whether the change to the event was intentional. For example, the event change may result from a direct user interaction with a user interface (e.g., a "delete event" menu item, a keyboard input for changing the value of an event property, and/or a drag and drop event in a calendar application to move the event from one time to another). A non-intentional change, by contrast, may result from another application accessing the event, such as a calendar synchronization between the calendar application and a mobile device. Several external protocols may be operative to allow changing of an event's properties without user interaction, such as Exchange® ActiveSync, Exchange® Web Services, Messaging Application Programming Interface (MAPI), and/or Collaboration Data Objects (CDO).

If, at stage 235, computing device 500 determines that the change did result from an intentional user interaction, method 200 may advance to stage 240 where computing device 500 may add a user intent identifier to the record of the event change in the change log. For example, server 110 may add metadata comprising text, binary data, and/or a hexadecimal value or values that identifies the change as resulting from a user's selection of a user interface element. The user intent metadata may comprise several pieces of data including, but not limited to, an identity of the user making the change, whether the user is an attendee, an organizer, and/or a delegate to the user with access to the user's calendar, a response status, a time the change was made, a new value of the property, and/or a prior value of the property. Method 200 may then end at stage 255.

If computing device 500 determines, at stage 235, that the change did not result from an intentional user interaction, method 200 may advance to stage 245 where computing device 500 may determine whether the change to the event may impact the user's attendance at the event. For example, a non-intentional change may modify an attendee event's start time from 9:30 AM to 10:30 AM. This change, or similar changes such as a duration change that may indicate a user is available for another meeting, and/or a location change, may cause the attendee to miss the meeting, and/or arrive late or early for the meeting.

From stage 245, method 200 may advance to stage 250 where computing device 500 may update the changed event property. For example, where the change is made to an attendee's copy of the event, server 110 may revert the out-of-sync property to match a value from the corresponding property of the organizer's event. If the change is made to the organizer's event, however, the property value may be propagated to the copies of the events associated with the attendees. Consistent with embodiments of the invention, server 110 may request confirmation from the organizer before propagating the change and/or revert the property's value to match that of the corresponding property from one of the attendees' copies of the event. Method 200 may then end at stage 255.

FIG. 3A comprises a block diagram of a first calendar 300 comprising a first meeting 310, a lunch event 320, and a second meeting 330. Meeting 310 and lunch meeting 320 may comprise events for which a user associated with first calendar 300 is an organizer, while second meeting 330 may comprise an event for which the user associated with first calendar 300 is an attendee.

FIG. 3B comprises a block diagram of a second calendar 350 comprising a copy of the first meeting 360 and a copy of the second meeting 370. Copy of first meeting 360 may comprise an event for which a user associated with second calendar 350 is an attendee, while copy of the second meeting 370 may comprise an event for which the user associated with second calendar 350 is an organizer.

Consistent with embodiments of the invention, method 200 may be invoked by server 110 to compare the events of first calendar 300 with the events of second calendar 350. For example, first meeting 310 may comprise a start time property of 9:30 AM while copy of the first meeting 360 may comprise a corresponding start time property of 11:30 AM. Since first meeting 310 is associated with the organizer of the event, and the start time property may be considered to be critical to attendance, the start time of 9:30 AM may be used to update copy of the first meeting 360 on second calendar 350. For a second example, method 200 may determine that the user of second calendar 350 accepted a meeting request for lunch meeting 320 and may further determine that the event is missing from second calendar 250. Server 110 may therefore create an event on second calendar 350 corresponding to lunch meeting 320. For another example, server 110 may compare copy of the second meeting 370 with second meeting 330 and determine that the only difference is in the meeting title. This difference may be determined to not be critical, and so the corresponding title properties may be left out-of-sync between the two events. Consistent with embodiments of the invention, the occurrence of the comparison and determination may be recorded in a log associated with the event. Server 110 may refer to the log on a later comparison of the two events, and may consequently skip over the non-critical information rather than re-compare the properties known to be out-of-sync. An administrator of server 110 may configure a list of event properties considered to be critical, and may update this list at any time. If the list has changed, server 110 may be operative to determine whether any previously determined out-of-sync properties are now considered to be critical, and may update those properties in accordance with method 200.

FIG. 4 is a block diagram of an example event 400 comprising a plurality of properties. Example event 400 may comprise a title 410, a subject 420, an organizer 430, an attendee list 440, a start time 450, a duration 460, a reminder alarm 470, a location 480, and a notes field 490. Start time 450, duration 460, and location 480, for example, may be considered critical properties to ensure an attendee does not miss the relevant event. Notes field 490, for example, may be designated as a private property by default.

Method 200 may produce an output file comprising information indicating what updates, if any, may have been made along with identifying information for the event being updated. An output file may be produced for each user and/or each event, such as a file per user, per event, per periodic update. Consistent with embodiments of the invention, a single output file may be used for all logged updates. Each logged update may comprise a plurality of properties, such as a category, an organizer, an attendee (and/or attendees), an indication if the item was repaired due to an issue with the organizer's item or the attendee's item, a start and end time of the meeting, a subject of the meeting, a meeting type (single event, occurrence master, or occurrence instance), and/or a repair action.

If an event includes a group and/or a distribution list (e.g., a single attendee entry associated with a plurality of users), server 110 may be operative to expand the distribution list and compare the organizer's event to a copy of the event on each of the plurality of users' calendars. Consistent with embodiments of the invention, expansion of the group may be limited to a maximum number of users to avoid negatively impacting server performance. This group expansion may be configured by an administrator of server 110.

An embodiment consistent with the invention may comprise a system for identifying corrupted event data. The system may comprise a memory storage and a processing unit coupled to the memory storage. The processing unit may be operative to determine whether a property of a first event differs from a corresponding property of at least one second event, determine whether the property of the first event was intentionally changed by a user, and, if so, update the corresponding property of the at least one second event to match the property of the first event.

Another embodiment consistent with the invention may comprise a system for identifying corrupted event data. The system may comprise a memory storage and a processing unit coupled to the memory storage. The processing unit may be operative to create an event, receive a change to a copy of the event, create an entry associated with the change in a changelog, and determine whether the change to the copy of the event is in response to an interaction with a user interface. If so, the processing unit may be further operative to associate a user intent identifier with the entry in the changelog.

Yet another embodiment consistent with the invention may comprise a system for identifying corrupted event data. The system may comprise a memory storage and a processing unit coupled to the memory storage. The processing unit may be operative to create a master event on an organizer's calendar, create a plurality of copies of the event on a plurality of attendee calendars, receive a change to a property of at least one of the plurality of copies of the event, log the change to the at least one of the plurality of copies of the event to a changelog associated with the master event, and determine whether the change to the at least one of the plurality of copies of the event resulted from a user interface interaction. If so, the processing unit may be further operative to associate a user-intent metadata identifier with the logged change in the changelog. If not, the processing unit may be further operative to determine whether the change to the property of the at least one of the plurality of copies of the event will impact the attendance of the at least one attendee associated with the at least one of the plurality of copies of the event and, if so, update the property of the at least one of the plurality of copies of the event to match a corresponding property of the master event.

Figure 5:
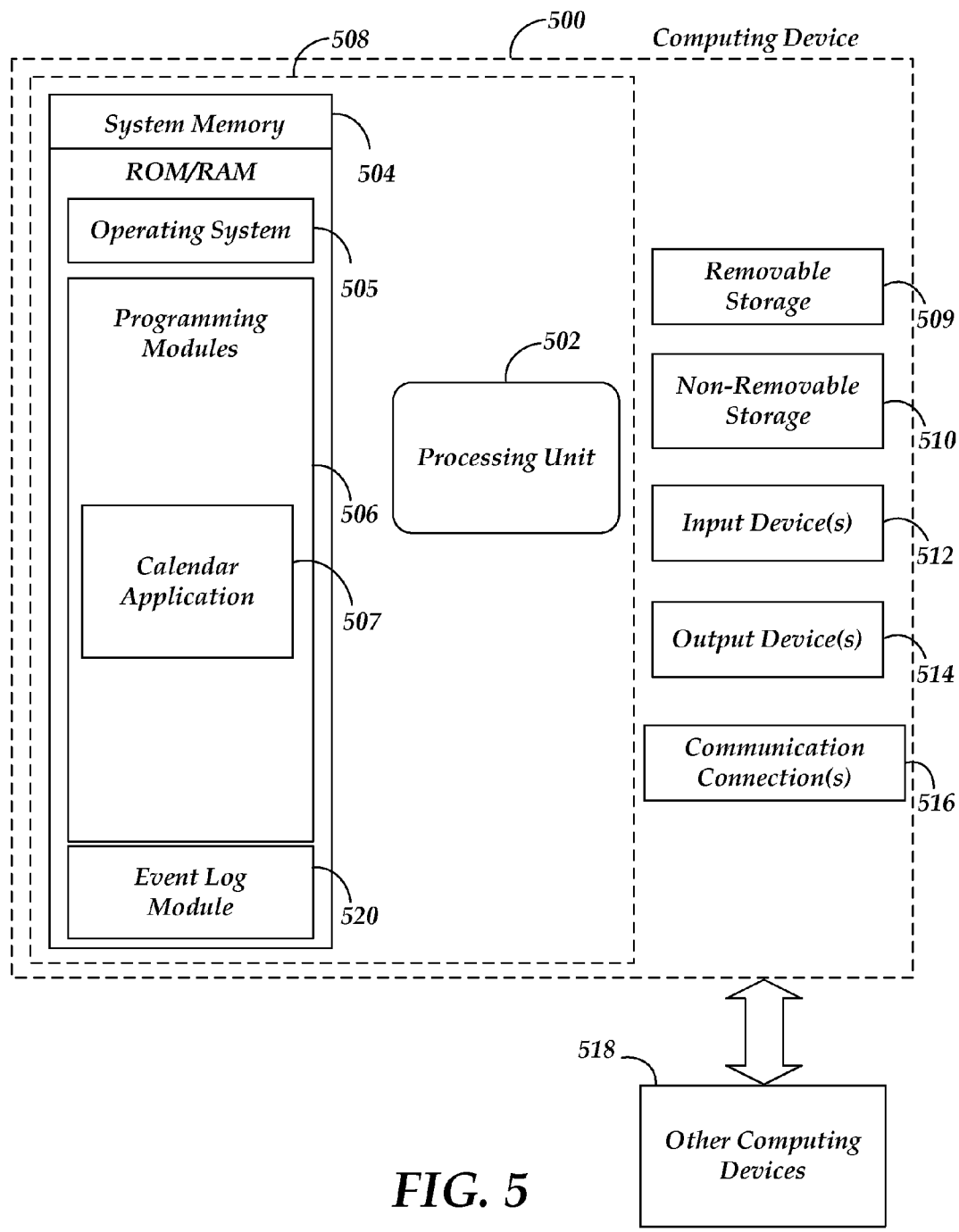
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 100 as described above. System 100 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a calendar application 507. Operating system 505, for example, may be suitable for controlling computing device 500's operation. In one embodiment, programming modules 506 may include an event log module 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. event log module 520) may perform processes including, for example, one or more of method 200's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for identifying corrupted event data, the method comprising:
   determining, by a calendar application, whether a property of a first event differs from a corresponding property of at least one second event, wherein the first event and the second event each comprise electronically stored data;
   in response to determining that the property of the first event differs from the corresponding property of the at least one second event, determining, by the calendar application, whether the corresponding property of the second event was intentionally changed by a user;
   in response to determining that the corresponding property of the at least one second event was not intentionally changed by the user, updating, by the calendar application, the corresponding property of the at least one second event to match the property of the first event;
   receiving a change to the first event;
   determining, by the calendar application, whether the change to the first event is associated with a user interaction, wherein determining whether the change to the first event is associated with the user interaction comprises determining, by the calendar application, whether the change to the first event resulted from a synchronization operation between a calendar application associated with the first event and a second application, wherein the synchronization operation does not comprise the user interaction; and
   in response to determining that the change to the first event is associated with the user interaction, assigning, by the calendar application, a user-intent metadata identifier to the change.

2. The method of claim 1, wherein the first event is associated with an attendee of the first event.

3. The method of claim 1, wherein the at least one second event is associated with an organizer of the first event.

4. The method of claim 1, further comprising periodically comparing, by the calendar application, the first event to each of a plurality of copies of the first event for determining whether the property of a first event differs from the corresponding property of each of the plurality of copies of the first event.

5. The method of claim 1, further comprising: in response to receiving the change to the first event, logging, by the calendar application, the change to the first event to a changelog.

6. The method of claim 5, further comprising: in response to determining that the change to the first event is associated with the user interaction, associating, by the calendar application, the assigned user-intent metadata identifier with the logged change in the changelog.

7. The method of claim 1, wherein determining whether the change to the first event is associated with the user interaction comprises determining, by the calendar application, whether the change to the first event resulted from a user interface interaction.

8. The method of claim 1, wherein determining whether the property of the first event was intentionally changed by a user comprises determining, by the calendar application, whether a changelog comprises a user-intent identifier associated with the change to the first event.

9. The method of claim 8, wherein the changelog comprises a plurality of records associated with changes to the first event.

10. The method of claim 8, wherein the changelog comprises a plurality of records associated with changes to the first event and the at least one second event.

11. The method of claim 1, further comprising:
    determining, by the calendar application, whether the difference between the property of the first event the corresponding property of the at least one second event is likely to cause an attendee associated with the first event to miss the first event; and
    in response to determining that the difference between the property of the first event the corresponding property of the at least one second event is not likely to cause an attendee associated with the first event to miss the first event, leaving the property of the first event out-of-sync with the corresponding property of the at least one second event.

12. The method of claim 11, wherein determining whether the difference between the property of the first event the corresponding property of the at least one second event is likely to cause an attendee associated with the first event to miss the first event comprises determining, by the calendar application, whether the property comprises at least one of the following: a start time, a duration, and a location.

13. A computer-readable storage medium which stores a set of instructions which when executed performs a method for identifying corrupted event data, the method executed by the set of instructions comprising:
    creating an event associated with at least one organizer and a plurality of attendees, wherein a copy of the event is associated with each of the plurality of attendees;
    receiving a change to at least one copy of the event;
    creating an entry associated with the change in a changelog;
    determining whether the change to the at least one copy of the event is in response to an interaction with a user interface, wherein determining whether the change to the first event is in response to the interaction with the user interface comprises determining whether the change to the at least one copy of the event resulted from a synchronization operation between a calendar application associated with the first event and a second application, wherein the synchronization operation does not comprise the user interaction; and in response to determining that the change to the at least one copy of the event is in response to the interaction with the user interface, associating a user intent identifier with the entry in the changelog.

14. The computer-readable storage medium of claim 13, wherein the changelog is associated with the at least one copy of the event.

15. The computer-readable storage medium of claim 13, wherein the changelog comprises a plurality of entries associated with each of the copies of the event.

16. The computer-readable storage medium of claim 13, wherein the user interface is associated with a calendar application.

17. The computer-readable storage medium of claim 13, wherein the method executed by the set of instructions further comprises:

periodically comparing each of the copies of the event to a master copy of the event to determine whether at least one property of at least one of the copies of the event differs from a corresponding property of the master copy of the event;

in response to determining that the at least one property of the at least one of the copies of the event differs from the corresponding property of the master copy of the event, determining whether the difference of the at least one property and the corresponding property is associated with the entry in the changelog; and in response to determining that the difference of the at least one property and the corresponding property is not associated with the entry in the changelog, updating the at least one property to match the corresponding property.

18. The computer-readable storage medium of claim 17, wherein the method executed by the set of instructions further comprises:

in response to determining that the difference of the at least one property and the corresponding property is associated with the entry in the changelog, determining whether the entry in the changelog is associated with the user intent identifier; and in response to determining that the entry in the changelog is not associated with the user intent identifier, updating the at least one property to match the corresponding property.

19. The computer-readable storage medium of claim 18, wherein the method executed by the set of instructions further comprises:

in response to determining that the entry in the changelog is associated with the user intent identifier, leaving the at least one property out-of-sync with the corresponding property.

20. A system for providing calendar repair using a standard message, the system comprising:

a memory storage device; and a processing unit coupled to the memory storage device, wherein the processing unit is operative to:

create a master event on a calendar comprising data electronically stored on the memory storage device associated with an organizer of a meeting;

create a plurality of copies of the master event on a plurality of calendars, wherein each of the plurality of calendars is associated with at least one attendee of the meeting;

receive a change to a property of at least one of the plurality of copies of the master event;

log the change to the at least one of the plurality of copies of the master event to a changelog associated with the master event;

determine whether the change to the at least one of the plurality of copies of the master event resulted from a user interface interaction, wherein determining whether the change to the at least one of the plurality of copies of the master event resulted from a user interface interaction comprises determining whether the change to the at least one of the plurality of copies of the master event resulted from a synchronization operation between the calendar associated with the master event and a second application associated with the at least one of the plurality of copies of the master event, wherein the synchronization operation does not comprise the user interaction;

in response to determining that the change to the at least one of the plurality of copies of the master event resulted from the user interface interaction, associating a user-intent metadata identifier with the logged change in the changelog;

in response to determining that the change to the at least one of the plurality of copies of the master event did not result from the user interface interaction, determine whether the change to the property of the at least one of the plurality of copies of the master event will impact the attendance of the at least one attendee associated with the at least one of the plurality of copies of the master event; and in response to determining that the change to the property of the at least one of the plurality of copies of the master event will impact the attendance of the at least one attendee associated with the at least one of the plurality of copies of the master event, update the property of the at least one of the plurality of copies of the master event to match a corresponding property of the master event.

* * * * *